Jan. 5, 1937. C. J. LEE 2,066,733

DOOR FOR POULTRY TRAP NESTS

Filed Dec. 2, 1935

INVENTOR
C. J. Lee
BY
ATTORNEY

Patented Jan. 5, 1937

2,066,733

UNITED STATES PATENT OFFICE 2,066,733

DOOR FOR POULTRY TRAP NESTS

Carl J. Lee, Fresno, Calif.

Application December 2, 1935, Serial No. 52,527

4 Claims. (Cl. 119—49)

This invention relates generally to trap nests for poultry and is directed in particular to a door for such trap nests.

The principal object of my invention is to provide a door for a poultry trap nest which may be easily and quickly set in an open position to permit entry of a hen into the nest, and to provide a door which will automatically close when the hen passes through the door opening and comes into contact with one edge of the door.

An additional object of my invention is to provide a door for a poultry trap nest which will remain clean and sanitary and which will not harbor lice and other vermin.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views.

Figure 1:
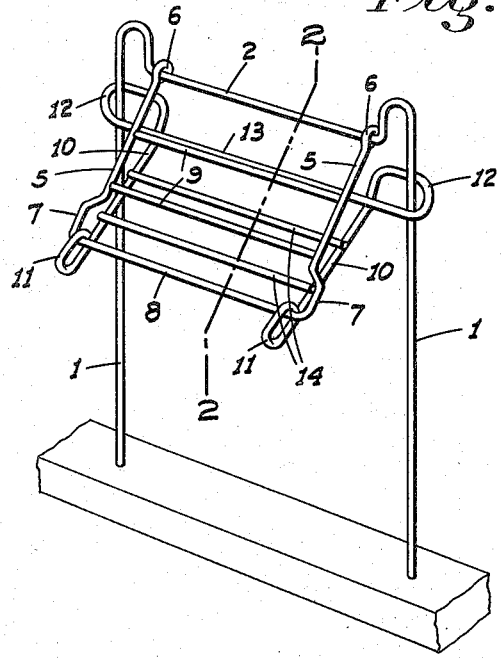
Fig. 1 is a perspective view of my improved trap nest door in open position and as the same would appear from inside the trap nest.

Referring now more particularly to the characters of reference on the drawing, the entire device is formed from relatively heavy but bendable wire, the numeral 1 indicating spaced vertical frame rods having an integral cross-rod 2 extending between the upper ends.

The door is formed of an upper section indicated generally at 3 and a lower section indicated generally at 4. The upper section comprises side wires 5 having eyes 6 formed on their upper ends and turnably engaging cross-rod 2. The side wires 5 adjacent their lower ends are bowed as at 7 towards the frame rods 1 and then turned inward to a termination in an integral cross-wire 8. Other cross wires 9 complete the upper door section.

The lower door section comprises side wires 10 suspended by means of elongated eyes 11 from the cross-wire 8, the bowed portions 7 of the side wires 5 permitting the side wires 10 to be suspended in vertical alinement therewith.

The lower ends of side wires 10 are bent laterally to pass in front of and around the frame rods 1 to form loops 12, and then continue in front of and between the side wires as an integral cross-wire 13. Additional cross-wires 14 complete the lower door section.

Figure 2:
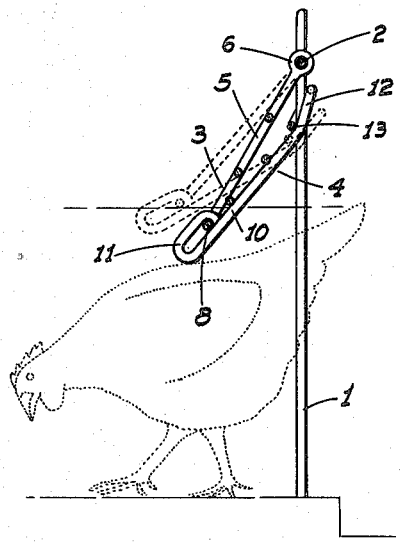
Fig. 2 is a sectional view taken on line 2—2 of Fig. 1 and illustrates, in dotted lines, the manner in which a hen entering the nest trips the door and allows the same to close.

The loops 12 are bent or canted relative to wires 10 as is clearly shown in Fig. 2, for the purpose hereinafter described.

In use, my improved door is mounted in the door opening of a poultry trap nest (not shown). The door is mounted in clearance relation to the opening on both sides, thereby permitting free operation of the door, as well as providing a door having no crevices where vermin can readily accumulate.

To set the door in an open position, the lower section 4 is pushed up, causing the door sections to buckle rearwardly. When the loops 12 have been moved to a point adjacent the top of rods 1 and cross-wire 8 engages against the lower side of elongated eyes 11, tending to shorten the effective length of side wires 10, the weight of the upper section of the door exerts a downward pressure on the ends of wires 10 adjacent the eyes 11 causing the canted loops 12 to be frictionally engaged or gripped against rods 1 as illustrated in Figs. 1 and 2. The degree of cant on loops 12 determines the angle at which the door sections will rest when set in an open position.

Figure 3:
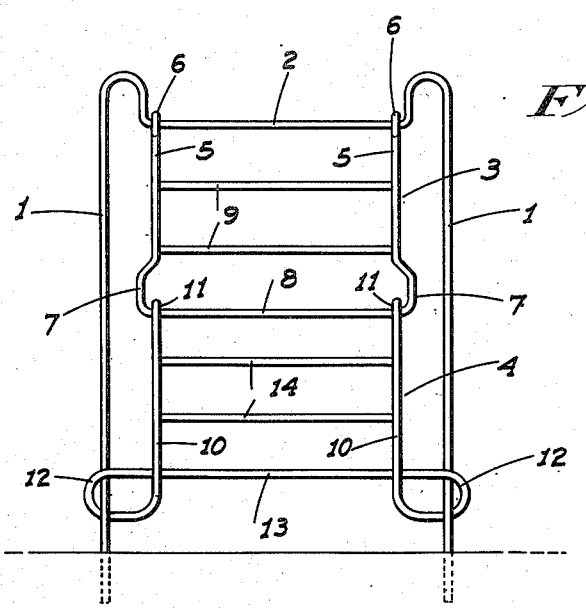
Fig. 3 is an elevation of the door taken from within the trap nest.

When a hen enters the trap nest, the hen's back or tail feathers will brush against cross-wire 8 and the upward movement imparted to the wire is sufficient to overcome the weight of the upper door section 3 and to move the lower section toward a horizontal position. This frees loops 12 from frictional engagement with rods 1, resulting in the loops sliding down the rods and bringing both door sections to a closed position as in Fig. 3. When the doors are in such closed position, the hen cannot push the lower door section outwardly because the loops 12 are permanently engaged with rods 1 as will be evident.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A door unit for a poultry trap nest comprising two spaced vertical frame rods, a cross member between the upper end portions of the frame rods, an upper door section swingably suspended from the cross member, a lower door section hingedly suspended from the upper door section and a loop rigid with and projecting from one side of the lower door section adjacent its lower edge and encircling the adjacent frame rod, said loop being canted lengthwise of said frame rod.

2. A door unit for a poultry trap nest comprising two spaced vertical frame rods, a cross rod extending between the upper ends of the frame rods, an upper door section, eyes turnably engaging the cross rod and suspending the upper door section therefrom, a lower door section, means hingedly connecting the adjacent edges of the door sections, and a metallic loop projecting from each side of the lower door section adjacent its lower edge and encircling the adjacent frame rod, said loops being canted lengthwise of the frame rods.

3. A device as in claim 2 in which said means includes elongated eyes.

4. A door unit for a poultry trap nest comprising a door frame for the door opening of the nest, said frame including a vertical side rod, an upper door section swingably suspended from the top of the frame, a lower door section hingedly connected to the upper door section, and a loop rigid with and projecting from one side of the lower door section adjacent its lower edge and encircling said rod, the loop being canted lengthwise of the rod.

CARL J. LEE.